United States Patent [19]

Skaller

[11] 4,070,072
[45] Jan. 24, 1978

[54] SELF LEVELING DISPENSER
[76] Inventor: Hans George Skaller, 8 Forage Ave., Cherry Hill, N.J. 08003
[21] Appl. No.: 721,526
[22] Filed: Sept. 8, 1976
[51] Int. Cl.² .................................................. A47F 1/00
[52] U.S. Cl. ........................................ 312/71; 108/136
[58] Field of Search ........................... 312/71; 108/136

[56] References Cited
U.S. PATENT DOCUMENTS

| 2,626,727 | 1/1953 | Gibbs et al. | 312/71 |
| 2,932,403 | 4/1960 | Vershbow | 312/71 |
| 2,934,211 | 4/1960 | Shiver | 312/71 |
| 3,154,280 | 10/1964 | Wiese | 312/71 |
| 3,635,173 | 1/1972 | Ruben | 312/71 |
| 3,807,821 | 4/1974 | Olsson | 312/71 |
| 3,820,478 | 6/1974 | Bergenthal | 312/71 |
| 3,871,725 | 3/1975 | Vilen et al. | 312/71 |
| 3,993,373 | 11/1976 | Vershbow | 312/71 |

Primary Examiner—Paul R. Gilliam
Assistant Examiner—Victor N. Sakran
Attorney, Agent, or Firm—Pasquale A. Razzano

[57] ABSTRACT

A self-leveling dispenser for supporting a plurality of articles in a stack includes a frame and an article support platform which extends horizontally from the frame. The platform is supported in the frame for vertical movement between a pair of vertically spaced positions. At least one constant torque spring mounted in the frame is operatively connected to the platform for balancing the weight of the platform throughout its movement. And, at least one counterbalance spring is additionally operatively connected between the frame and the platform for counterbalancing the weight of articles placed on the platform with a predetermined weight to spring extension ratio or gradient.

12 Claims, 4 Drawing Figures

SELF LEVELING DISPENSER

The present invention relates to self leveling dispensers, and more particularly self leveling dispensers of the type which will support a stack of individual articles with the uppermost article in the stack in a predetermined position.

Self leveling dispensers for all types of dishware and associated wares such as trays, racks, glasses, cups, mugs, platters, etc. have been in use for many years for food service establishments, hospitals, institutions, schools and the like where a continuous supply of individual articles must be present for people to use. Such self leveling dispensers support a stack of articles on a resiliently mounted platform so that the uppermost article in the stack will always be located at a predetermined level on the stand. Preferably such dispensers will hold a relatively tall stack of articles and will keep the uppermost articles at a predetermined height, e.g. the level of an adjacent counter top so that the articles are easily located and removed from the stack. After an article is removed, the support mechanism in the dispenser causes the entire remainder of the stack to move upwardly slightly so that the next article in the stack is presented at the desired location or level.

In order for self leveling dispensers to function properly the articles being stacked and dispensed must be uniform in weight, shape and dimension so that they have a uniform weight to height ratio or gradient over the entire stacking height. The ability of most previously proposed self leveling dispensers to maintain a constant serving level, upon withdrawal or addition of an article to or from the stack is based on the physical properties of all springs, i.e. over the entire active range of a spring, its ratio of weight to extension, or compression, (i.e. the pound/inch relationship of the spring) remains constant and cannot be changed. However, in practical use previously proposed self leveling dispensers do not function exactly as they are intended and do not maintain the top level of the stack in the exact same position regardless of the height of the stack. The reason for this is that the platform supporting the stack to be dispensed has a constant dead weight which is of a significant magnitude in relation to the weight of the wares being dispensed. As a result, the combined pounds to inch relationship of the stack, plus the support platform of constant weight that is supported by the springs of the mechanism varies with the height of the stack and increases greatly as the height of the stack is reduced. Thus when the counterbalance springs used in previously proposed self leveling dispensers are calibrated for a pounds to inch relationship selected for the full height of the article stack, the spring moves out of calibration as the stack becomes depleted and is unable to balance the depleted stack plus the support platform at the dispensing level because as the stack to be dispensed is being depleted the pounds to inch relationship of the remaining stack becomes progressively greater than the pounds to inch relationship when the stack is at its full height.

For these reasons, many manufacturers calibrate the counterbalance springs at the mid-range of the stacking height, with the result that the intended dispensing level is maintained at mid-range, but varies to different positions when the stack is full or depleted. As a result the operator does not enjoy the true benefit of a self leveling dispenser which maintains the top of the stack at a constant level regardless of the height of the stack.

Moroever, previously proposed self leveling dispensers required the force which counterbalances movement of the support platform to be adjusted when the type of articles to be supported on the dispenser was changed. For example, when very light articles such as plastic cups or bowls are used, the total stack weight is less than that for trays and dishes, thereby necessitating a change in the counterbalance force. For extremely light wares, it is often impossible to balance the stack in the self leveling dispenser because the total weight of the stack may be less than the dead weight of the support platform, so that a reduction of the stack height is not sufficient to cause the spring to respond to any significant weight changes.

For these reasons, and because individual pieces or types of plates, trays, and other articles to be stacked, vary in height, it is often necessary for the springs of the self leveling dispensers to be specifically calibrated to equal the pounds to inch relationship of the stack to be dispensed. Thus it is normally required that the manufacturer of the self leveling dispenser know in advance the pounds to inch ratio of the stack of articles to be dispensed, and purchases of the dispensers often send the manufacturer samples of the type of articles that will be stacked so that the manufacturer can properly calibrate the dispenser. This requirement causes great problems and inconveniences for the purchaser and manufacturer alike, because the self leveling dispensing equipment is often ordered from the manufacturer at a time when the purchaser is not in a position to select a particular pattern or type of dishware, cups, trays, etc.

A number of different attempts have been made to overcome these disadvantages. One approach has been the development of self leveling dispensers which take advantage of the principle of the lever. By using the lever principle a single spring or a combination of several springs with a fixed gradient can be used to balance a stack of dishware with greatly varying pounds per inch ratio. However, such dispensers have relatively complex linkages and lever assemblies allowing the operator, by means of manual manipulation, to apply different forces on the spring by changing the active length of the arc of the lever in relationship to a fixed fulcrum. The merchanisms which allow this manipulation of lever type self leveling dispensers typically include chains, gears, sprockets, pulleys, cables, lead screws, cam followers, etc., in a very complex assembly requiring frequent servicing and lubrication. Such complex systems also worsen the aforementioned lack of response of the entire dispensing mechanism by adding a significant amount of internal friction to the dead weight of the supporting platform.

Another type of self leveling dispenser, such as is shown, for example, in U.S. Pat. No. 3,635,173, eliminates the use of such levers and simply uses a series of springs which can be selectively connected to the support platform. However such arrangements do not take into account the dead weight of the support platform, so that the weight to height or extension ratio of the stack still varies depending upon the height of the stack, with the result that the top level of the stack is not maintained at a constant position regardless of the stack's height.

Accordingly, it is an object of the present invention to support a stack of articles on a self leveling dispenser with the uppermost article of the stack maintained at a predetermined level.

Another object of the present invention is to resiliently support a stack of articles on a vertically movable platform which is biased towards its upward position with a constant force.

Yet another object of the present invention is to provide an article support stand of the described type which is relatively simple and durable in construction and inexpensive to manufacture.

A further object of the present invention is to provide a self leveling dispenser wherein the force gradient counterbalancing the weight of articles on a stack on the dispenser can be varied to accommodate different types of articles.

In accordance with the present invention, a self leveling dispenser is provided which is capable of dispensing stacks of dinnerware of a wide range of different weight to height ratios without employing the aforementioned auxiliary components and complex systems such as are used in lever type self leveling dispensers. Further, the present invention eliminates any reduction of response of the dispensing mechanism due to a change of the load, regardless of whether the stack of wares is at full height, half height, or depleted.

According to the present invention the dead weight and friction factor of the entire support platform assembly which, in previously proposed self leveling dispensers prevents the dispenser from functioning properly throughout its entire range, is eliminated, independent of the counterbalance spring action, by means of a constant torque retracting or extending power reel calibrated to balance the dead weight of the platform assembly and accumulated friction created by the ascent and descent of the platform. In the dispenser according to the present invention the force on the counterbalancing springs is zero when the stack is fully depleted (i.e. when the support platform is empty) and the maximum force is developed when the stack is at full height, with the weight of the support platform being supported by the constant torque spring. As a result, the spring or springs calibrated to balance the stack weight throughout the entire height of the stack will maintain an even dispensing level regardless of whether the stack is full, half full or nearly depleted. That is, the counterbalancing springs simply counterbalance the weight of the stack so that the constant weight to height ratio of the stack is directly balanced only by the constant weight to extension ratio of the counterbalance springs. Thus the invention makes it possible to dispense stacks of plastic or paperware of any weight to height ratio, even if the load is of a weight less than that of the support platform, since the support platform's weight is eliminated as a factor in the stack weight to height ratio by the constant torque spring.

In a specific embodiment of the invention the need for dispensing stacks of articles of greatly varying weight to height ratios, without the use of complex mechanical levers, is satisfied by providing a constant torque spring and a row of coil type extension springs of equal length, but of different spring constants, or weight to extension ratios, vertically suspended at one end in a fixed position within a housing over one or more horizontally disposed bars that are operatively and rigidly connected to the support platform. The constant torque spring is permanently fixed to the bar or bars while the coil springs are selectively connected to the bars to enable the gradient required to balance a specific stack of articles to be varied. Those coil springs not required for the selected gradient are stored in an inactive position within the housing.

The above, and other objects, features and advantages of this invention will be apparent in the following detailed description of an illustrative embodiment thereof, which is to be read in conjunction with the accompanying drawings, wherein.

Figures 1, 4:
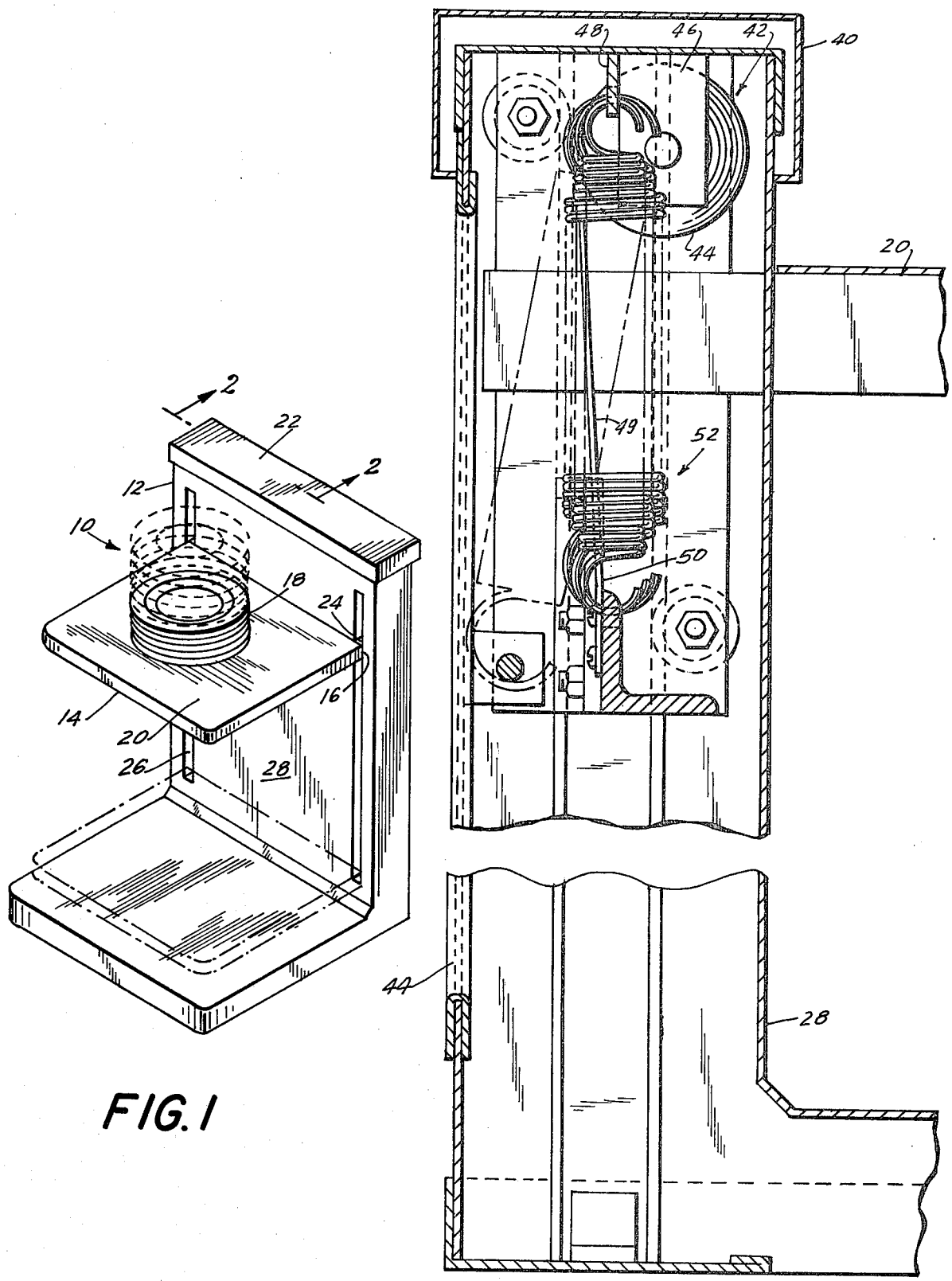
FIG. 1 is a perspective view of an article support stand constructed in accordance with the present invention.
FIG. 4 is a vertical sectional view, taken along line 4—4 of FIG. 3.

Referring now to the drawing in detail, and initially to FIG. 1 thereof, it will be seen that an article support stand 10, constructed in accordance with the present invention, includes a generally vertically extending frame or housing 12 which contains the actuating mechanism of the device, as more fully described hereinafter.

In order to support articles on stand 10 a horizontally extending support platform 14 is mounted at one end on housing 12, for vertical movement between upper and lower vertically spaced positions, illustrated respectively in solid and phantom lines in FIG. 1. The platform serves to support a stack of articles 18 on its upper surface 20. The articles 18 may be of any desired form and, in the illustrative embodiment of the invention, they are shown as a stack of individual dishes such as may be used in a cafeteria. Of course, it is to be understood that the articles supported on platform 14 may take any desired form as may be required for the particular use to which the dispenser 10 is placed.

Self leveling dispenser 10 is constructed to maintain the uppermost article or tray in the stack of articles 18 at a predetermined level, such as for example, at the level of the top 22 of frame 12. Thus, support platform 14 is adapted to move downwardly as additional articles are placed on stack 18 and to move upwardly as articles are removed from the stack, thereby maintaining the uppermost article at the desired predetermined level.

Figure 2:
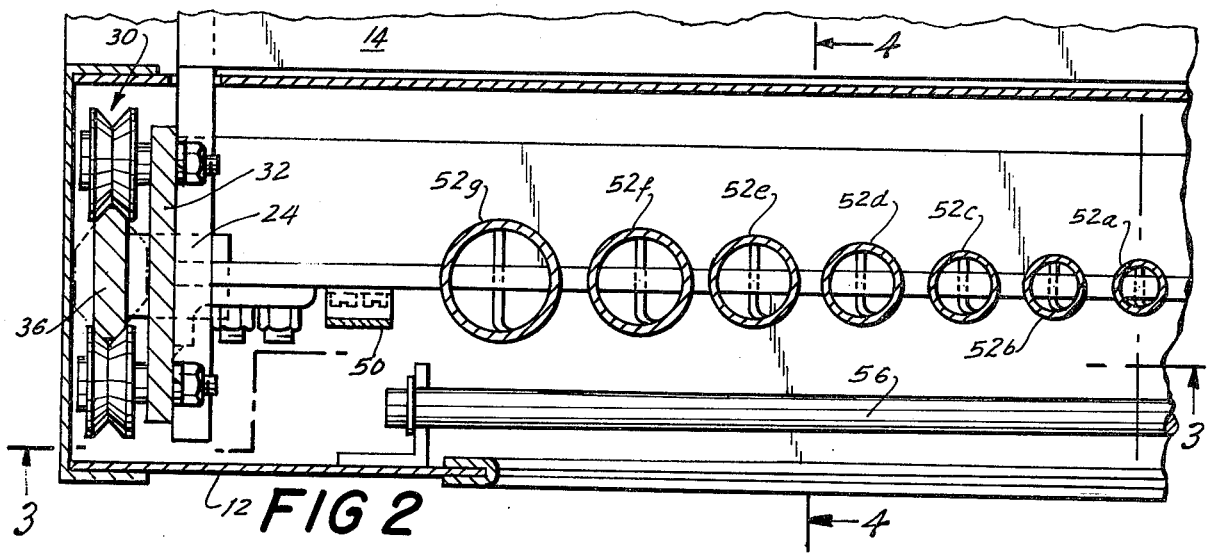
FIG. 2 is an enlarged top plan view, of the one half of the self leveling dispenser of the present invention.

To accomplish this result support platform 14 is mounted on housing 12 by a pair of arms 24 which extend through vertical slots 26 in the front face 28 of stand 10. As seen in FIGS. 2 and 4 (it is noted that in FIGS. 2–4 only one half of the housing 12 and its contents are illustrated, since the other half is identical) arms 24 are secured to a carriage assembly 30 located within the housing. The carriage assembly includes a pair of vertically extending end plates 32 to which arms 24 are respectively connected. Two pairs of rollers 34 are rotatably mounted on the exterior of each plate 32 in vertically spaced relationship. The rollers each have a grooved peripheral configuration for cooperating with a vertically extending guide bar 36. This guide bar has a generally rectangular configuration, with one diagonal of the bar extending between adjacent pairs of rollers, transversely of the frame or housing 12. In this manner the vertically spaced rollers guide the carriage assembly 30 in vertical movement and hold it against lateral movement. In addition, the cooperating pairs of vertically spaced rollers will prevent tilting of platform 14.

Figure 3:
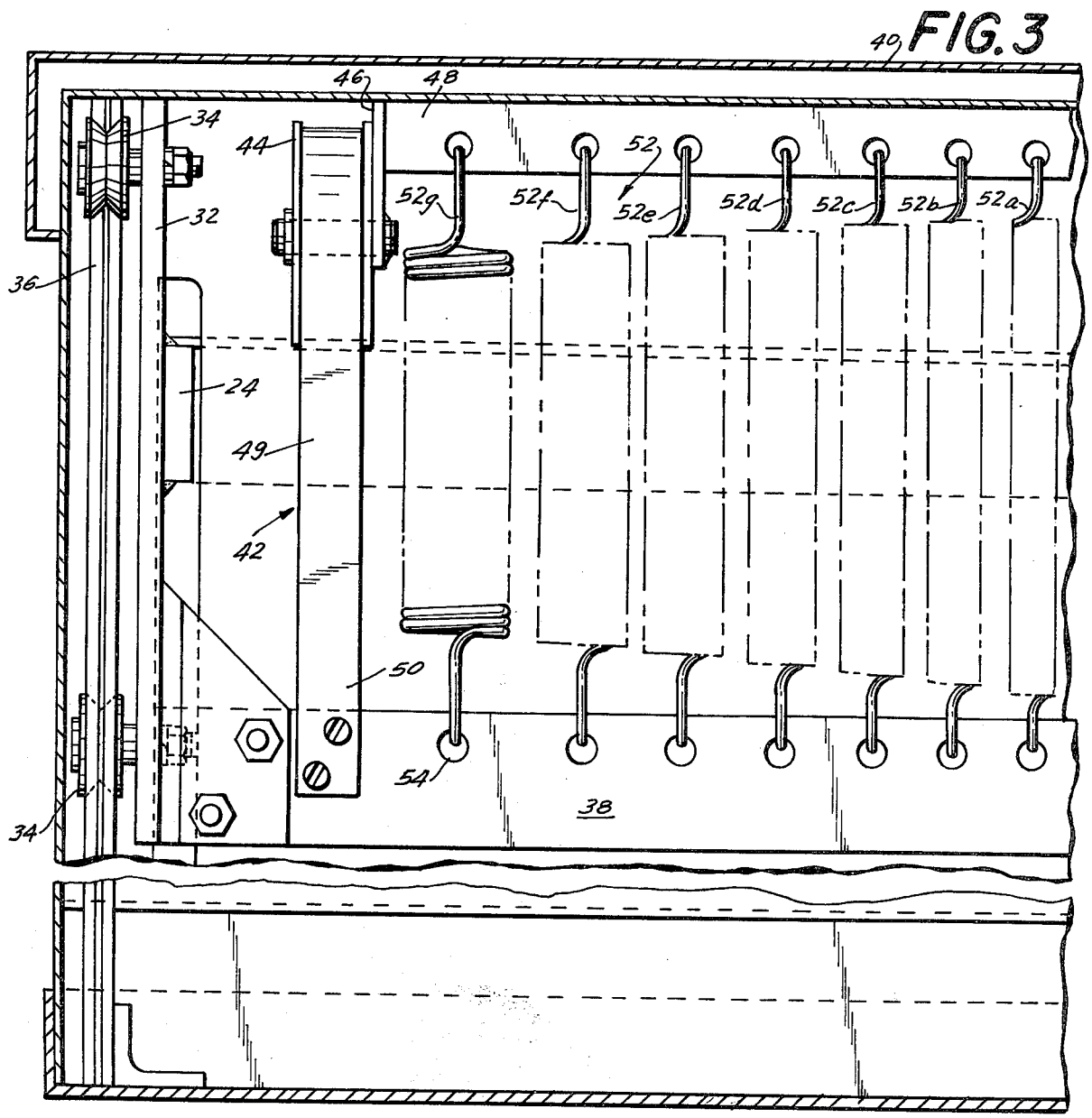
FIG. 3 is a front view taken along the line 3—3 in FIG. 2.

End plates 32, at the opposite ends of the housing, are interconnected by the support platform 14 extending between arms 24, and also by a cross piece or power bar 38 located within the housing and extending across the carriage, as seen in FIG. 3.

Housing 12 is of generally conventional sheet metal construction and can take any desired shape. The top end of the generally rectangular housing is closed by a cover plate 40, which can be removably secured to the housing in any convenient manner. The rear wall 42 of the housing may have an access opening 44 formed therein through which access to the interior of the housing can be provided in order to permit spring adjustment, as described hereinafter. This opening can be selectively closed with a door (not shown).

The weight of support platform 14 and the articles placed on the platform is counterbalanced by a spring assembly 42. This assembly includes a pair of constant torque reel springs 45 mounted within the housing in any convenient manner. In the illustrative embodiment of the invention the reel springs are mounted on the ends 46 of a support bar 48 secured to the top 40 of housing 12. These constant torque springs (also referred to as negator springs) each consist of a coiled metal strip 49, having one end mounted on a reel 49 which is fixed to bracket 46. The opposite end 50 of spring strip 49 is rigidly secured to power bar 38.

Springs 45 are selected to balance the dead weight of the support platform 14 and the carriage, and whatever frictional forces are involved in rolling movement of the rollers 34 on the vertical bar 36. In this manner the effect of the weight of the support platform and carriage, and friction, are eliminated from considerations involved in balancing the stack of articles to be placed on the support platform. The spring produces a constant torque, will balance the weight of the platform 14, and will hold it in a fixed position at any position to which the platform is moved, even when no stack of articles is on the platform. In this manner the constant torque springs balance the weight of the support platform at all positions between the extreme upper and lower positions of the platform in its path of travel during operation.

The weight of the stack of articles to be placed on support platform 14 is balanced by a series of springs 52. In the illustrative embodiment of the invention thirteen springs 52 are provided within housing 14. Spring 52a is the central spring and is located substantially on the center line of the housing. The six springs 52b-52g, are duplicated on both sides of the housing. These springs are conventional coiled tension springs and they have varying spring constants, i.e. the springs have different weight to extension ratios. The upper end of each of the springs is connected permanently to bar 48 at the upper end of the housing and the lower ends of the springs are selectively connected in openings 54 is the bar 38. In use the operator of the device determines the weight to height ratio of the stack of articles to be supported on platform 14 and then selects the combination of springs 52a-52g which have a corresponding combined weight to extension ratio. These selected springs are then connected to bar 38 and they will exactly balance the weight to height ratio of the stack of articles placed on platform 14. Since the weight of the platform and carriage and the friction in the system is eliminated by use of negator springs 45, the weight of the stack of articles will be balanced only by the selected springs 52 so that the top of the stack of articles will be maintained at a constant height regardless of the number of articles in the stack.

The selected springs 52 are secured to bar 38 by manually connected the hooked ends at the bottom of the springs to the bar through the opening 44 at the back of the housing. Those springs which are not used are stored with their lower ends simply hooked around and engaged with a storage bar 56 extending across opening 44, as illustrated in FIGS. 2 and 4.

In a presently preferred embodiment of the present invention the thirteen counterbalanced coil springs 52 are provided in a predetermined array such that three springs (52a and the two springs 52b) each have a weight to extension gradient of ⅛ lb. per inch. The two springs 52c have weight to extension ratios of ¼ lb. per inch and the four springs 52d, 53e have weight to extension ratios of ½ lb. per inch. The pair of springs 52f have a weight to extension ratio of 1 lb. per inch and the pair of springs 52g have a weight of extension ratio of two lbs. per inch. With this arrangement, the article support stand can support stacks of weights having weights varying from 2.56 lbs. in a 22 inch stack, with only the spring 52a connected to power bar 38, through to a stack weight of approximately 182 lbs. for a stack height of 22 inches with all of the springs connected to the power bar. As will be appreciated, a variety of different weights can be supported between these extremes by approximate selection of the combination of springs connected to the power bar.

Accordingly, it will be seen that as a result of this construction a wide variety of loads can be balanced in the self leveling dispenser, with the sensitivity of response of the spring balancing mechanism balancing the weight of articles on the stack being adapted to change within a range of ⅛ of a pound, or two ounces. The success of the self leveling dispenser of the present invention, with its ability to permit adjustments with such fine sensitivity, is based on the use of the constant torque reel springs 45 to balance the weight of the support platform and elminate it from consideration of the weight to height gradient selected for use in the spring set 52. Thus the principle of self leveling dispensers, i.e. of counterbalancing the weight to height ratio of the stack of articles to be supported with a corresponding weight to height ratio in a spring system, is achieved by the spring set 52, without introducing the weight of the support platform into the considerations, whereby the deficiencies of previously proposed systems, which cannot compensate for the weight of the support platform, are avoided.

Although an illustrative embodiment of the present invention has been described herein with reference to the accompanying drawings, it is to be understood that the invention is not limited to that precise embodiment, but that various changes and modifications may be effected therein by one skilled in the art without departing from the scope or spirit of this invention. For example, in lieu of single bar 38 it is feasable to provide more than one such bar is spaced, fixed parallel position to each other so that the number of required coiled exflusion springs 52 can be distributed over the total length of such multiple bars resulting in greatly reduced width of the dispenser, a feature that would be disirable when installation space for the dispenser is limited.

What is claimed is:

1. A self leveling dispenser for dispensing a stack of articles comprising, a frame, an article support platform extending horizontally from said frame for supporting said stack of articles, means in said frame for guiding the support platform in vertical movement between upper and lower vertically spaced positions; at least one constant torque spring means mounted in said frame and operatively connected to said platform for balancing the weight of said platform with a force of constant value; and at least one counterbalance spring having a constant spring ratio operatively connected between said frame and said platform for counterbalancing the weight of articles placed on the platform with a predetermined uniform weight to spring extension gradient along the entire path of travel of the support platform whereby the weight of the stack is supported only by said counterbalance spring while the weight of said platform is supported only by the constant torque spring and the top of the stack of articles is maintained at a predetermined level regardless of the height of the stack.

2. A self leveling dispenser as defined in claim 1 wherein said at least one spring comprises a plurality of coil springs having different spring constants.

3. A self leveling dispenser as defined in claim 2 wherein said constant torque spring means comprising a negator spring.

4. A self leveling dispenser for dispensing a stack of articles comprising a housing, a horizontally extending support platform mounted in said housing for vertical movement between upper and lower vertically spaced positions, said housing including a pair of vertical guide bars and carriage means operatively connected to said platform and engaged with said bars for guiding vertical movement of the platform; at least one constant torque spring means mounted in said housing and operatively engaged with said carriage means for balancing the weight of said platform and carriage means at every position of the platform between said upper and lower positions independently of any load on the platform with a force of constant value; and a plurality of counterbalance springs mounted in said housing and selectively connectable to said carriage means; said counterbalance springs having constant weight to extension ratios for counterbalancing the weight of articles in the stack on the platform with a predetermined uniform weight to spring extension gradient whereby the weight of the stack of articles is supported only by said counterbalance springs and the force applied by said counterbalance springs to the platform zero at said upper position and a maximum at said lower position while the weight of said platform is continuously supported throughout the entire path of travel thereof by said constant torque spring means to prevent the weight of the platform from affecting operation of the counterbalance springs, thereby to maintain the top of the stack of articles at a predetermined level in the dispenser regardless of the height of the stack.

5. A self leveling dispenser as defined in claim 4 wherein said guide bars are laterally spaced on opposite sides of said housing and said carriage has two pairs of vertically spaced rollers engaged with each of said guide bars.

6. A self leveling dispenser as defined in claim 5 wherein said guide bars are generally square in cross section and positioned with one of their diagonals extending transversely of the housing between the front and rear thereof, said rollers being grooved and respectively engaged with opposed corners of the guide bars whereby the carriage means and platform are guided and supported both vertically and laterally in the housing.

7. A self leveling dispenser as defined in claim 4 wherein said counterbalance springs comprise a plurality of springs having different spring constants.

8. A self leveling dispenser as defined in claim 7 wherein said plurality of springs respectively having spring constants of 2 lbs/in; 1 lb/in; ½ lb/in; ¼ lb/in; and ⅛ lb/in.

9. A self leveling dispenser as defined in claim 4 wherein said constant torque spring comprises a reel-type metal band negator spring.

10. A self leveling dispenser as defined in claim 9 wherein the reel of the negator spring is mounted in said housing and one end of said steel band is secured to said carriage means.

11. A self leveling dispenser as defined in claim 10 wherein said counterbalance springs are coil springs having one of their ends secured to said housing and their other ends adapted to be secured to said carriage means.

12. A self leveling dispenser as defined in claim 11 including a storage bar in said housing for securing the other ends of those counterbalance springs which are not in use.

* * * * *